Apr. 24, 1923.

P. DOWD 1,453,240

MOTOR VEHICLE ALARM

Filed Feb. 7, 1922

WITNESSES

INVENTOR
Patrick Dowd
BY
ATTORNEYS

Patented Apr. 24, 1923.

1,453,240

UNITED STATES PATENT OFFICE.

PATRICK DOWD, OF BROOKLYN, NEW YORK.

MOTOR-VEHICLE ALARM.

Application filed February 7, 1922. Serial No. 534,725.

*To all whom it may concern:*

Be it known that I, PATRICK DOWD, a citizen of the United States, and a resident of the city of New York, borough of Brooklyn, in the county of Kings and State of New York, have invented a new and Improved Motor-Vehicle Alarm, of which the following is a full, clear, and exact description.

This invention relates to an alarm device and was primarily designed for use with motor vehicles to signal their removal by an authorized individual.

The general object of this invention is the provision of a simple, efficient and durable alarm device for signaling the removal of a motor vehicle operated by the shaking of the car as it is moved away or by the operation of the transmission mechanism when the latter is put into operation to remove the car.

This object is accomplished by mounting on the car signal means and associating with the signal means a device capable of operating the signal means upon the shaking of the car, and means that may be associated with the transmission mechanism to operate the signal means upon the operation of the said transmission mechanism.

This and other objects of the invention will be more clearly understood from the following detailed description and accompanying drawings.

Figure 1:
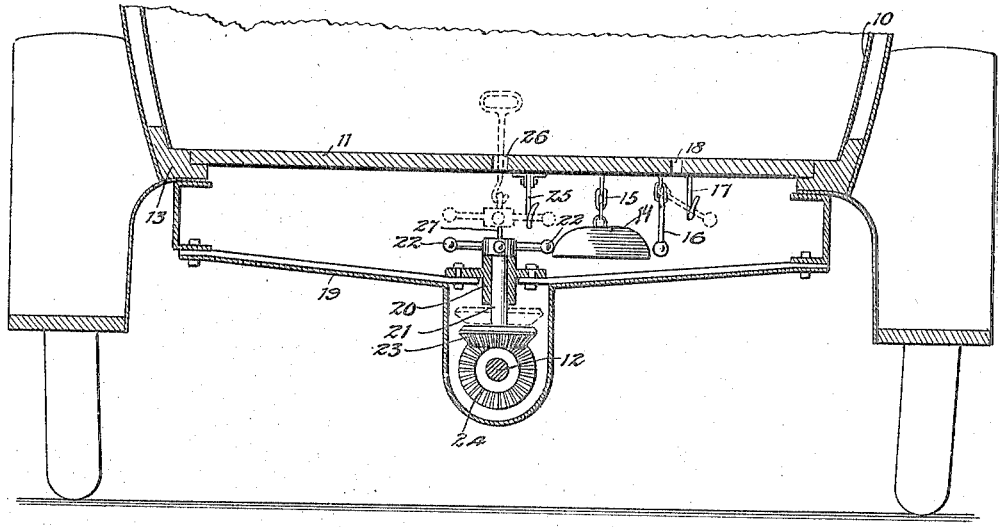
Figure 2:
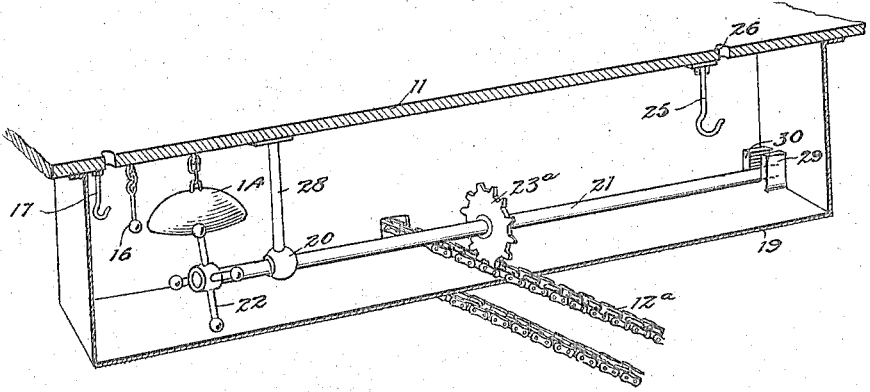

Figure 1 is a vertical cross section through a motor vehicle showing the signal mechanism device and operating mechanism mounted in position; and Figure 2 is a perspective view of a modified form of the signal device associated with a different type of transmission mechanism.

Referring to Figure 1, a motor vehicle assemblage 10 including a floor 11, a transmission shaft 12 and a frame 13 is shown. A gong 14 is suspended from the floor 11 by a chain 15. This gong 14 constitutes the signal means. A tongue 16 is suspended from the floor 11 so that it may oscillate upon the shaking of the car to strike the gong 14 to sound the same. In order to prevent this tongue from continually sounding the gong when the machine is in operation by the owner or other authorized person a hook 17 is provided for retaining the tongue 16 in an inoperative position, as shown by the dotted lines in Figure 1. An opening 18 is provided in the floor 11 so that any means may be projected through the floor to engage the tongue when it is desired to position it in the hook 17.

Carried by the frame 13 is a casing 19 which encloses the signal device and the operating means so that it is very difficult to gain access to the mechanism to put it out of working order. A bearing 20 is carried by the casing 19 and rotatably mounted in this bearing is a shaft 21. The shaft 21 as well as being rotatable is slidable endwise in the bearing 20. Fixed to the upper end of the shaft 21 are striking arms 22 which upon the rotation of the shaft 21 sound the gong 14. Attached to the lower end of the shaft 21 is a bevel gear 23 which meshes with a gear 24 mounted on the transmission shaft 12 when the shaft 21 is in its lower position. A depending hook 25 is attached to the floor 11 and serves to engage one of the striking arms 22 when the shaft 21 has been raised to the position shown by the dotted lines in Figure 1, and to retain the shaft 21 in the raised position. In alinement with the shaft 21 an opening 26 is made in the floor 11 so that means may be inserted to engage an eye 27 attached to the upper end of the shaft in order to raise the shaft and striking arms. A satisfactory means for engaging the eye in order to raise the shaft and striking arms would be a hook such as shown by the dotted lines in Figure 1.

A modification of the signal means is shown in Figure 2. In this case instead of the transmission shaft 12, a chain drive 12$^a$ is provided, and instead of the bevel gears 23 and 24 for conveying the motion of a transmission mechanism to the shaft 21 a gear wheel 23$^a$ is provided. A bearing 20 for the shaft 21 is supported by means of a flexible rod 28 attached to the bottom 11 of the automobile. In order to retain the shaft 21 in position when the gear wheel 23$^a$ is lowered into engagement with the transmission mechanism two plates 29 and 30 are positioned in the casing 19 and the shaft fits between these plates.

The operation of the alarm device is as follows:

When the machine is brought to a stop, the hook shown by dotted lines in Figure 1 or any other means, is made use of for releasing the tongue 16 from the hook 17 and the arm 22 from the hook 25. On the release of the arm 22 from the hook 25, the shaft 21 is carried downward by its own weight and the gear wheel 23 meshes with the gear 24 on the transmission shaft. If any one enters the car they cause the body of the car to shake, oscillating the tongue 16 which strikes the gong 14 and gives a signal. If the car is pushed from its position over a slightly uneven surface the tongue 16 is caused to oscillate, sounding the gong 14. If the engine of the machine is put into operation to drive the transmission mechanism then the shaft 21 is rotated, rotating the arm 22 which in turn sounds the gong, giving the alarm. When the owner or authorized person desires to operate the car he raises the tongue 16 and positions it in the hook 17, and the arms 22 and positions one of them in the hook 25. Then the machine may be operated without giving any alarm. The only difference in the operation of the modification shown in Figure 2 is that instead of raising the shaft vertically the free end of the shaft 21 is raised in position in the hook 25 thus releasing the gear from the transmission mechanism.

I would state in conclusion that while the illustrated examples constitute practical embodiments of my invention I do not limit myself strictly to the exact details herein illustrated since manifestly the same can be considerably varied without departing from the spirit of the invention as defined in the appended claim.

Claim:

A device of the character described for use with vehicles, comprising a casing suspended from the vehicle, a gong suspended from the vehicle and located in the casing, a striking arm suspended from the vehicle adjacent the gong for sounding the latter when the car is in position, a hook suspended from the vehicle adjacent the striking arm for receiving the latter to retain it in an inactive position when the vehicle is in motion, and means for inserting into the casing to place the striking arm in said hook to retain it in an inactive position when the vehicle is in motion.

PATRICK DOWD.